(12) United States Patent
Filippov et al.

(10) Patent No.: US 11,572,777 B2
(45) Date of Patent: Feb. 7, 2023

(54) CONSTRUCTING DIGITAL TWINS FOR OIL AND GAS RECOVERY USING ENSEMBLE KALMAN FILTER

(71) Applicant: Landmark Graphics Corporation, Houston, TX (US)

(72) Inventors: Andrey Filippov, Houston, TX (US); Sergio Henrique Guerra de Sousa, Houston, TX (US); Cesar Enrique Bravo, Richmond, TX (US)

(73) Assignee: Landmark Graphics Corporation, Houston, TX (US)

( * ) Notice: Subject to any disclaimer, the term of this patent is extended or adjusted under 35 U.S.C. 154(b) by 377 days.

(21) Appl. No.: 16/615,982

(22) PCT Filed: Jun. 7, 2019

(86) PCT No.: PCT/US2019/036082
§ 371 (c)(1),
(2) Date: Nov. 22, 2019

(87) PCT Pub. No.: WO2020/159564
PCT Pub. Date: Aug. 6, 2020

(65) Prior Publication Data
US 2021/0404314 A1    Dec. 30, 2021

Related U.S. Application Data

(60) Provisional application No. 62/797,616, filed on Jan. 28, 2019.

(51) Int. Cl.
*E21B 44/00* (2006.01)
*G01V 99/00* (2009.01)

(52) U.S. Cl.
CPC .......... *E21B 44/00* (2013.01); *E21B 2200/20* (2020.05); *G01V 99/005* (2013.01)

(58) Field of Classification Search
CPC ....... E21B 44/00; E21B 2200/20; G01V 1/40; G01V 99/005; G05B 13/048
See application file for complete search history.

(56) References Cited

U.S. PATENT DOCUMENTS

| | | | |
|---|---|---|---|
| 7,584,081 B2 * | 9/2009 | Wen | E21B 43/00 703/10 |
| 7,672,825 B2 * | 3/2010 | Brouwer | E21B 47/00 703/10 |

(Continued)

FOREIGN PATENT DOCUMENTS

| | | |
|---|---|---|
| NO | 20210817 A1 | 6/2021 |
| WO | 2018165352 | 9/2018 |

OTHER PUBLICATIONS

Naevdal, G., et al. "Near-Well Reservoir Monitoring Through Ensemble Kalman Filter" Society of Petroleum Engineers, SPE 75235 (2002) (Year: 2002).*

(Continued)

*Primary Examiner* — Jay Hann
(74) *Attorney, Agent, or Firm* — Kilpatrick Townsend & Stockton LLP

(57) ABSTRACT

A self-adapting digital twin of a wellbore environment can be created. The self-adapting digital twin incorporates a standalone Ensemble Kalman Filter (EnKF) module with a constant parameter digital twin developed for a fixed environment. The standalone EnKF module receives streaming measurement data from multiple sensors and prediction data from the digital twin and executes the standalone EnKF module using the streaming measurement data and the prediction data from the digital twin. The results of executing the standalone EnKF module are input parameter corrections for the digital twin that are communicated to the digital twin. Output predictions of the digital twin are used (Continued)

to modify operational parameters of an oil or gas recovery process.

17 Claims, 7 Drawing Sheets

(56) References Cited

U.S. PATENT DOCUMENTS

| | | | |
|---|---|---|---|
| 8,612,195 B2* | 12/2013 | Sun | G01V 11/00 703/10 |
| 8,972,232 B2* | 3/2015 | Sarma | G01V 99/005 703/10 |
| 9,080,387 B2* | 7/2015 | Schulte | E21B 7/06 |
| 10,408,955 B2* | 9/2019 | Dykstra | E21B 43/26 |
| 10,545,260 B2* | 1/2020 | Hu | G01V 99/005 |
| 10,718,205 B2* | 7/2020 | Spicer | E21B 47/06 |
| 10,901,377 B2* | 1/2021 | Dykstra | E21B 21/08 |
| 2015/0184508 A1 | 7/2015 | Huang et al. | |
| 2016/0265341 A1 | 9/2016 | Subervie et al. | |
| 2018/0066475 A1* | 3/2018 | Vadali | E21B 47/09 |
| 2018/0066503 A1 | 3/2018 | Vittal et al. | |
| 2018/0340411 A1 | 11/2018 | Munda et al. | |
| 2020/0182051 A1* | 6/2020 | Filippov | E21B 47/00 |
| 2021/0149077 A1* | 5/2021 | Zagayevskiy | G01V 99/005 |
| 2021/0404314 A1 | 12/2021 | Filippov et al. | |
| 2021/0404328 A1* | 12/2021 | Filippov | E21B 49/003 |

OTHER PUBLICATIONS

Wen, X., et al. "Real-Time Reservoir Model Updating Using Ensemble Kalman Filter with Confirming Option" Society of Petroleum Engineers, SPE 92991 (2005) (Year: 2005).*

Zagayevskiy, Y. & Deutsch, C. "Assimilation of Time-Laps Temperature Observations and 4D-Seismic Data with the EnKF in SAGD Petroleum Reservoirs" Society of Petroleum Engineers, SPE 174547, J. Canadian Petroleum Technology (2015) (Year: 2015).*

Aanonsen et al., "The Ensemble Kalman Filter in Reservoir Engineering—a Review", Society of Petroleum Engineers, SPE 117274, vol. 14, No. 3, Sep. 2009, pp. 393-412.

Bektas et al., "Application of Kalman Filter to Predictions of Pore Pressure While Drilling", Society Of Petroleum Engineers, SPE-174908-MS, Sep. 28-30, 2015, pp. 1-15.

Bloemen et al., "Soft Sensing for Gas Lift Wells", Society of Petroleum Engineers, SPE 90370, vol. 11, No. 4, Dec. 2006, pp. 454-463.

Denney, "Advanced Reservoir-Management Workflow—EnKF-Based Assisted-History-Matching Method", Society of Petroleum Engineers, Journal of Petroleum Technology, SPE-0410-0081-JPT, vol. 62, Issue 4, Apr. 2010, pp. 81-82 & 85.

Gryzlov et al., "Soft Sensing for Two-Phase Flow Using an Ensemble Kalman Filter", IFAC Proceedings Volumes, vol. 42, No. 11, 2009, 6 pages.

De Kruif et al., "Soft-Sensing for Multilateral Wells with Downhole Pressure and Temperature Measurements", Society of Petroleum Engineers, SPE 118171, 2008, pp. 1-6.

Leskens et al., "Downhole Multiphase Metering in Wells by Means of Soft-sensing", Society of Petroleum Engineers, SPE 112046, Feb. 2008, pp. 1-11.

Lorentzen et al., "History Matching Channelized Reservoirs Using the Ensemble Kalman Filter", Society of Petroleum Engineers, SPE 143188, Mar. 2012, pp. 137-151.

Lorentzen et al., "Underbalanced and Low-head Drilling Operations: Real Time Interpretation of Measured Data and Operational Support", Society of Petroleum Engineers, SPE 71384, 2001, pp. 1-12.

Lorentzen et al., "Underbalanced and Low-head Drilling Operations: Real Time Interpretation of Measured Data and Operational Support", Society of Petroleum Engineers, SPE-71384-MS, Sep. 30-Oct. 3, 2001, pp. 1-12.

Myrseth et al., "Hierarchical Ensemble Kalman Filter", Society of Petroleum Engineers, SPE 125851, vol. 15 No. 2, Jun. 2010, pp. 569-580.

International Patent Application No. PCT/US2019/036082, International Search Report and Written Opinion dated Oct. 28, 2019, 11 pages.

Saad et al., "The Use of the Ensemble Kalman Filter for Production Management in the Presence of Impermeable Obstructions", Journal of Petroleum Exploration and Production Technology, vol. 6, No. 3, Sep. 2016, pp. 519-531.

Tarrahi et al., "Assimilation of Microseismic Data into Coupled Flow and Geomechanical Reservoir Models with Ensemble Kalman Filter", Society of Petroleum Engineers, SPE-166510-MS Conference Paper, Sep. 30-Oct. 2, 2013, pp. 1-16.

GB. Application No. GB2107362.2, "First Examination Report", dated May 12, 2022, 2 pages.

* cited by examiner

CONSTRUCTING DIGITAL TWINS FOR OIL AND GAS RECOVERY USING ENSEMBLE KALMAN FILTER

CROSS-REFERENCE TO RELATED APPLICATIONS

This claims priority to U.S. Provisional Patent Application No. 62/797,616, filed on Jan. 28, 2019 and titled "Constructing Digital Twins for Oil and Gas Recovery using Ensemble Kalman Filter," the disclosure of which is hereby incorporated by reference in its entirety.

TECHNICAL FIELD

The present disclosure relates generally to processes and systems for oil and gas recovery. More specifically, but not by way of limitation, this disclosure relates to systems and methods for constructing self-adapting digital twins for systems in rapidly changing environments, such as for real time applications in oil and gas recovery, using the Ensemble Kalman Filter (EnKF).

BACKGROUND

Oil and gas recovery processes operate in rapidly changing environments involving many variables such as porosity of the rock in a formation, the viscosity of the deposit, etc. These variables can be difficult to account for in advance and changes can negatively impact production time and cost of the oil and gas recovery processes. Fixed-parameter models can be developed to help predict the evolution of these processes; however, constant spatial and temporal variation of process parameters related to, for example, depletion of pressure and changing properties of reservoir make adaptation of numerical models based on data from multiple sensors difficult. In the rapidly changing environments of oil and gas recovery, this results in sub-optimal processes.

DETAILED DESCRIPTION

Figure 1:
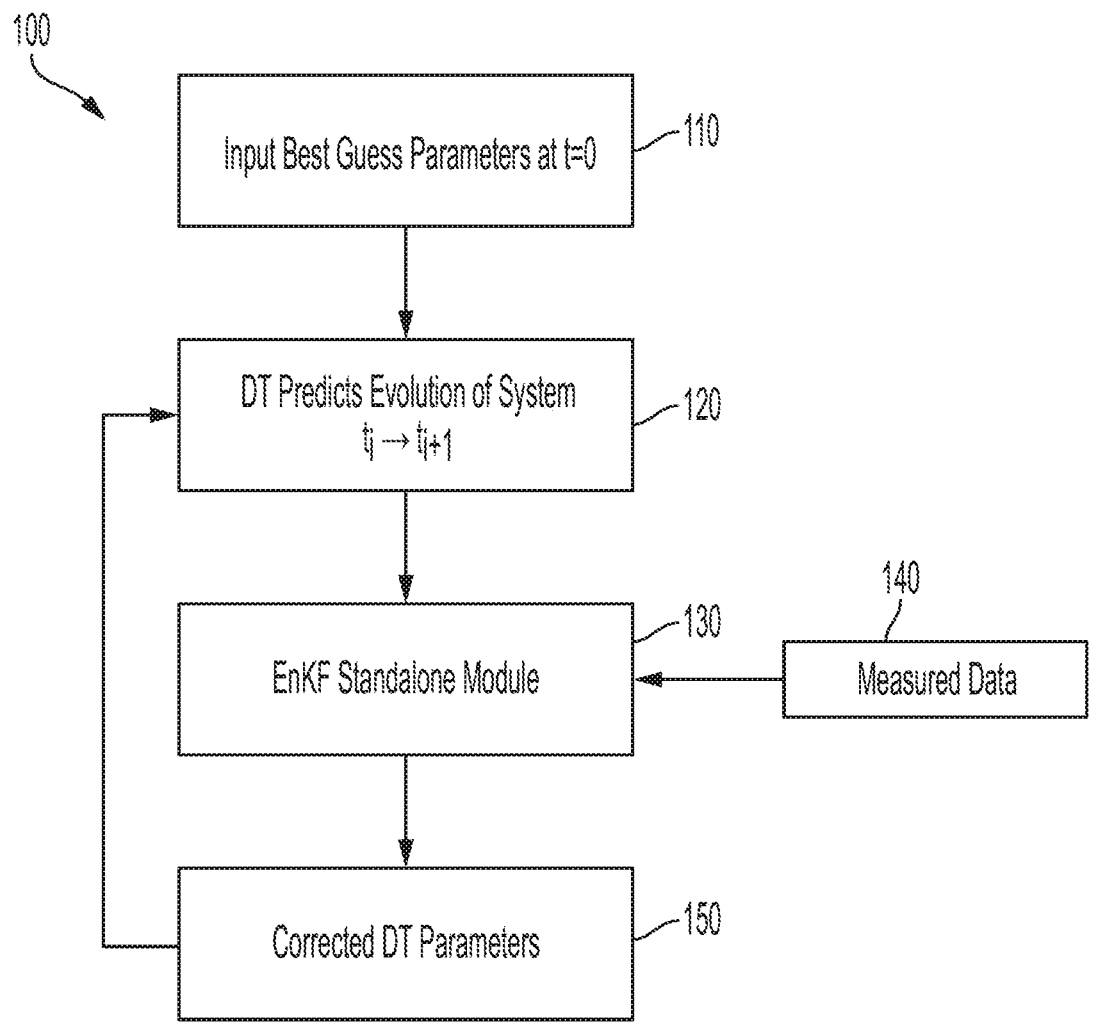
FIG. 1 is a flowchart of an example of a process for implementing an EnKF in a standalone module according to some aspects of the present disclosure.

Certain aspects and features relate to constructing self-adapting digital twins for systems in rapidly changing environments, such as real time applications in oil and gas recovery, using an Ensemble Kalman Filter (EnKF). The EnKF as tool for model adjustment can be beneficial for constructing self-adapting digital twins in a wide variety of oil and gas applications without changing algorithms or model structures. The EnKF is a recursive filter suitable for problems with a large number of variables, such as discretizations of partial differential equations in geophysical models. The Ensemble Kalman Filter can provide an effective way of constructing self-adapting digital twins using digital twins developed for fixed model parameters in a variety of applications. According to some aspects of the present disclosure, the EnKF can be used in a standalone mode, without changing the algorithms and model structure of optimized nonlinear systems, including digital twins.

Data analytics-based models and hybrid digital twins can be identified by a set of numerical parameters used in nonlinear systems, including comprehensive physical models and reduced order physical models. In applications, the parameters can be defined based initially on available measurements and analytical data, and then updated in response to changes in the environment. The EnKF can allow both initial identification and consequent updating of the model parameters based on the measurement data obtained in discrete time steps. This approach can allow building digital twins in algorithmically simple and numerically highly efficient ways without modifying the algorithmic and numerical structure of the optimized digital twin. In some examples, this property of EnKF can be used for developing a standalone numerical module and corresponding microservice for dynamic optimization of a wide variety of nonlinear models, including comprehensive digital twins based on multi-sensor measurements.

The paradigm of the digital twin as a representative digital replica of physical assets, processes and systems can be useful in oil and gas recovery. Benefits can include improved quality and speed of decision-making, greater asset utilization, condition-based monitoring and prognostication, enhanced operational efficiency and improvements in preventive maintenance. But there can be challenges in implementing the digital twin in the energy sector, including the complexity and multi-scale character of physical-physical processes involved in the production of hydrocarbons, both in the reservoir and wellbore. In addition, there can be related complexity of mathematical and numerical models, making their realizations numerically problematic for real-time applications. Further, constant spatial and temporal variation of process parameters related, for example, to depletion of pressure and changing properties of reservoir. These variations can make adapting numerical models based on data from multiple sensors, whose accuracy and number can also vary with time, difficult.

While the complexities of the physical processes and the models can be addressed by developing adequate reduced order physical, data-driven and hybrid physical-data analytics models, addressing the constant spatial and temporal process parameter variations can involve implementing effective algorithms allowing dynamic adjusting of models used.

The EnKF can be a fast and stable tool for nonlinear system adaptation. The EnKF is easily programmable and parallelizable, implying high numerical efficiency. In some implementations, a standalone EnKF module and microservice, e.g., a smaller application to execute the operations of the standalone EnKF module and communicate with the digital twin, can be developed based on an EnKF for optimizing nonlinear systems, including comprehensive digital twins utilizing multi-channel sensor data, which can allow dynamic adaptation without changing the algorithmic structure and numerical implementation of the digital twins.

A standalone EnKF module can be used with a wide variety of physical models without changing the internal structure of the EnKF module or the structure of the physical models, making the standalone EnKF module a universal and effective model optimizer. Combining a standalone EnKF module with a non-adapting digital twin developed for fixed model parameters, for example boundary conditions or matrix properties, and using streaming measurable data from multiple sensors can produce a self-adapting digital twin that can be used in real-time applications.

In some examples, a digital twin can be characterized by a state vector that includes unknown constant and transient parameters (for example, reservoir permeability, or fracture dimensions) which can be defined based on a set of observations (e.g., predictions of measurable parameters, such as flow rates, temperatures, and pressures in reservoir or wellbore). These vectors are, in general case, time dependent. At an initial time, realizations of the state vector are chosen randomly distributed around estimated values of the state vector based, for example, on field measurements or geophysical observations.

The EnKF algorithm for dynamic adaptation of a digital twin is a two-step algorithm where first step is a forecast step and the second step is an update step. Based on condition of the system at a time t−1, a model M yields a prediction of the system's condition at time t. The EnKF algorithm uses the data obtained at time t to generate a correction, resulting in an updated state vector. At each time step, the estimation for parameters of the system can be obtained by ensemble averaging of the corresponding components of the updated state vector.

FIG. 1 is a flowchart of an example of a process 100 for implementing an EnKF in a standalone module for a digital twin according to some aspects of the present disclosure. The digital twin may be a non-adapting digital twin developed for fixed model parameters. In some implementations, the standalone EnKF module may be a block of program code, e.g., a microservice, that executes in conjunction with a digital twin. In some implementations, the standalone EnKF module may be a physically separate piece of equipment in communication with a computing system that executes the digital twin.

Referring to FIG. 1, at block 110, the state vector at initial time t=0 is built using the values of the digital twin parameters randomly distributed around best guesses for the estimated values of the state vector. For example, the state vector may be built based on historical data or analytical estimation. At block 120, the digital twin predicts the evolution of the system from time $t_i$ to time $t_{i+1}$ of the next measurement. At block 130, operation of the standalone EnKF module compares the digital twin predictions with the measured data 140 received from sensors, and at block 150 generates corrected digital twin parameters. The corrected digital twin parameters can be input to the digital twin at block 120 at a next time step and a new prediction generated by the digital twin. This process can be repeated when new measurements are available in real-time or near-real-time. The standalone EnKF module can be used with applications of different physical nature and any number of sensor data inputs and optimized model parameters.

Figure 2:
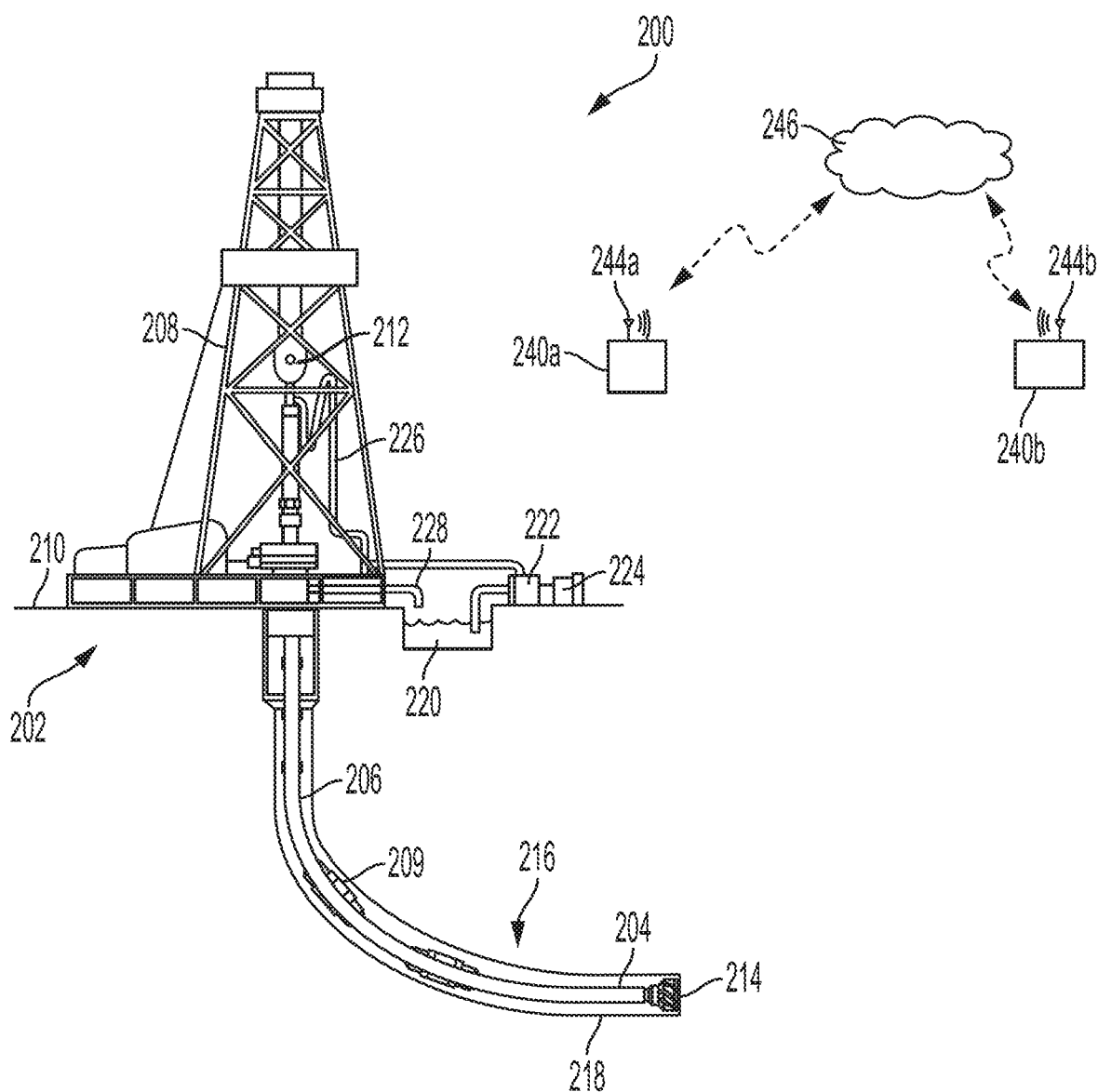
FIG. 2 is a cross-sectional side view of an example of a drilling system according to some aspects of the present disclosure.

FIG. 2 is a cross-sectional side view of an example of a drilling system 200 according to some aspects of the present disclosure. A wellbore of the type used to extract hydrocarbons from a formation may be created by drilling into the earth 202 using the drilling system 200. The drilling system 200 may be configured to drive a bottom hole assembly (BHA) 204 positioned or otherwise arranged at the bottom of a drillstring 206 extended into the earth 202 from a derrick 208 arranged at the surface 210. The BHA 204 may include a steering mechanism to enable adjustments to the drilling direction. For example, the steering mechanism may enable horizontal drilling of the wellbore. The derrick 208 includes a kelly 212 used to lower and raise the drillstring 206. The BHA 204 may include a drill bit 214 operatively coupled to a tool string 216, which may be moved axially within a drilled wellbore 218 as attached to the drillstring 206.

Tool string 216 may include one or more tool joints 209 which may further include sensors (not shown) for monitoring conditions in the wellbore, for example, but not limited to, rock porosity, absolute and relative permeabilities of formations, effective hydraulic diameter, of the wellbore, etc. The combination of any support structure (in this example, derrick 208), any motors, electrical equipment, and support for the drillstring and tool string may be referred to herein as a drilling arrangement. Additional sensors (not shown) may be disposed on the drilling arrangement (e.g., on the wellhead) to monitor process parameters, for example, but not limited to, production fluid viscosity, density, etc. It should be appreciated that the parameters and conditions mentioned above do not form an exhaustive list and that other parameters and conditions may be monitored without departing from the scope of the present disclosure.

During operation, the drill bit 214 penetrates the earth 202 and thereby creates the wellbore 218. The BHA 204 provides control of the drill bit 214 as it advances into the earth 202. Drilling fluid, or "mud," from a mud tank 220 may be pumped downhole using a mud pump 222 powered by an adjacent power source, such as a prime mover or motor 224. The drilling fluid may be pumped from the mud tank 220, through a stand pipe 226, which feeds the drilling fluid into the drillstring 206 and conveys the drilling fluid to the drill bit 214. The drilling fluid exits one or more nozzles (not shown) arranged in the drill bit 214 and in the process cools the drill bit 214. After exiting the drill bit 214, the drilling fluid circulates back to the surface 210 via the annulus defined between the wellbore 218 and the drillstring 206, and in the process returns the drill cuttings and debris to the surface. The cuttings and drilling fluid mixture are passed through a flow line 228 and are processed such that a cleaned drilling fluid is returned down hole through the stand pipe 226 once again. Drilling fluid samples drawn from the mud tank 220 may be analyzed to determine the characteristics of the drilling fluid and any adjustments to the drilling fluid chemistry that should be made.

Sensors and/or instrumentation related to operation of the drilling system 200 may be connected to a computing device 240a. In various implementations, the computing device 240a may be deployed in a work vehicle, may be permanently installed with the drilling system 200, may be handheld, or may be remotely located. In some examples, the computing device 240a may process at least a portion of the data received and may transmit the processed or unprocessed data to a remote computing device 240b via a wired or wireless network 246. The remote computing device 240b may be offsite, such as at a data-processing center. The remote computing device 240b may receive the data, execute computer program instructions to analyze the data, and communicate the analysis results to the computing device 240a.

Each of the computing devices 240a, 240b may include a processor interfaced with other hardware via a bus. A memory, which may include any suitable tangible (and non-transitory) computer-readable medium, such as RAM, ROM, EEPROM, or the like, can embody program components that configure operation of the computing devices 240a, 240b. In some aspects, the computing devices 240a, 240b may include input/output interface components (e.g., a display, printer, keyboard, touch-sensitive surface, and mouse) and additional storage.

The computing devices 240a, 240b may include communication devices 244a, 244b. The communication devices 244a, 244b may represent one or more components that facilitate a network connection. In the example shown in FIG. 2, the communication devices 244a, 244b are wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication devices 244a, 244b may use acoustic waves, surface waves, vibrations, optical waves, or induction (e.g., magnetic induction) for engaging in wireless communications. In other examples, the communication devices 244a, 244b may be wired and can include interfaces such as Ethernet, USB, IEEE 1394, or a fiber optic interface. The computing devices 240a, 240b may receive wired or wireless communications from one another and perform one or more tasks based on the communications.

A self-adapting digital twin may be developed for an oil and gas production process by generating a mathematical model of the process and using data from the sensors disposed on the drilling arrangement and/or on the tool string to provide data for real-time or near real-time adjustment of the input parameters of the model. In accordance with aspects of the present disclosure, the standalone EnKF module can compare outputs (i.e., predictions) from the digital twin with the measured data from the sensors to automatically correct the input parameters for the digital twin. Thus, the data is simulated to adjust the digital twin based on the observations.

The EnKF module is termed a standalone module because the same EnKF algorithm can be applied to many different models with only a small number of modifications to the EnKF algorithm, for example, specifying a number of inputs (e.g., predictions and measurements) and outputs (e.g., corrections). Changes to existing software models for systems or processes are not needed to use the standalone EnKF module. The standalone EnKF module can be a software module, for example a micro-service running in conjunction with a system or process model on the same computing system or on a separate computing system, or a separate physical device including the EnKF processing capabilities and communication capabilities to communicate with a computing system executing the system or process model.

Figure 3:
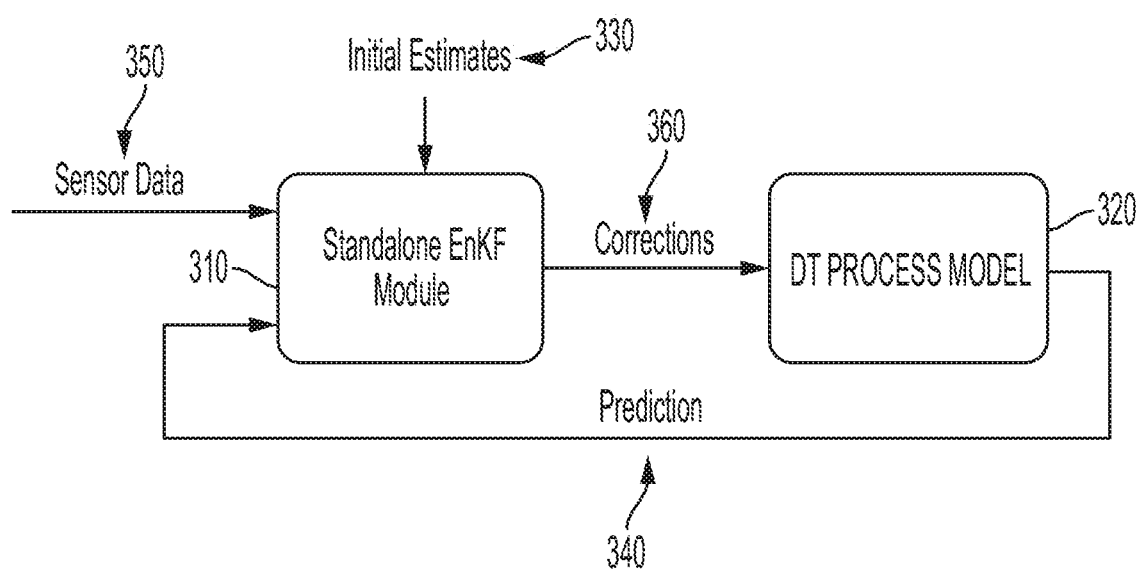
FIG. 3 is a block diagram illustrating an example of a standalone EnKF module used with a digital twin for an oil or gas process according to some aspects of the present disclosure.

FIG. 3 is a block diagram illustrating an example of a standalone EnKF module used with a digital twin for an oil or gas process according to some aspects of the present disclosure. Referring to FIG. 3, a standalone EnKF module 310 may be used to improve predictions of a digital twin 320 developed for an oil or gas process to, for example, predict oil production for a following week. The digital twin 320 may be an existing fixed parameter software model of the oil or gas process. The standalone EnKF module 310 may be a software module, for example a micro-service running in conjunction with a model on the same computing system or on a separate computing system, or a separate physical device including the EnKF processing capabilities and communication capabilities to communicate with a computing system executing the model.

At an initial time (e.g., before sensor data and/or digital twin predictions are available), initial estimates 330 of the input parameters for the digital twin 320 may be input to the standalone EnKF module 310. The input parameters for the digital twin 320 may be determined by the modelling requirements of the digital twin 320. The digital twin 320 predicts the same physical properties as are measured by the sensors. The standalone EnKF module 310 may be configured to accept the number and type of input parameters (e.g., digital twin predictions and corresponding sensor data) of the digital twin 320. The configuration may be accomplished by, for example, passing software configuration parameters (e.g., number and type of model input parameters) to the standalone EnKF module 310 via a user interface or another method.

The initial estimates 330 may be based on historical data or analytical estimates. High accuracy of the initial estimates 330 is not necessary. Examples of the input parameters may be properties of the formation, properties of the well, properties of the pipe, viscosity of fluids, etc. It should be appreciated that the input parameters mentioned above do not form an exhaustive list and that other input parameters may be used without departing from the scope of the present disclosure. The standalone EnKF module 310 may generate an initial set of input parameters for the digital twin 320 based on the initial estimates 330.

A simulation may be performed by the digital twin 320 based on the initial estimates 330 and a set of prediction data 340 may be generated. Sensor data 350 may be obtained from operation of the physical process. For example, data may be received from sensors disposed on the drilling arrangement that monitor process parameters and/or sensors that monitor conditions in the wellbore. The prediction data 340 and the sensor data 350 may be input to the standalone EnKF module 310. The standalone EnKF module 310 can compare each piece of the prediction data 340 to a corresponding piece of sensor data 350 (i.e., a measurement of a physical parameter and a prediction of the same physical parameter).

Based on the comparison of the prediction data 340 from the digital twin 320 and the sensor data 350, the standalone EnKF module 310 can generate corrections 360 to the input parameters for the digital twin 320. For example, values for individual input parameters may be increased or decreased according to the results of the comparison. The prediction data 340 subsequently generated by the digital twin may be modified based on the input parameter corrections 360 as the corrected input parameters are processed by the digital twin. Sensor data 350 may be streamed and received in real-time or near real-time, for example every one-tenth of a second or another time period, and the standalone EnKF module 310 can generate corrections 360 to the input parameters each time new sensor data 350 is received. In some implementations, historical data as well as current data may be used to improve the accuracy of the digital twin. In such cases, more weight may be placed be on the current sensor data.

Figure 4:
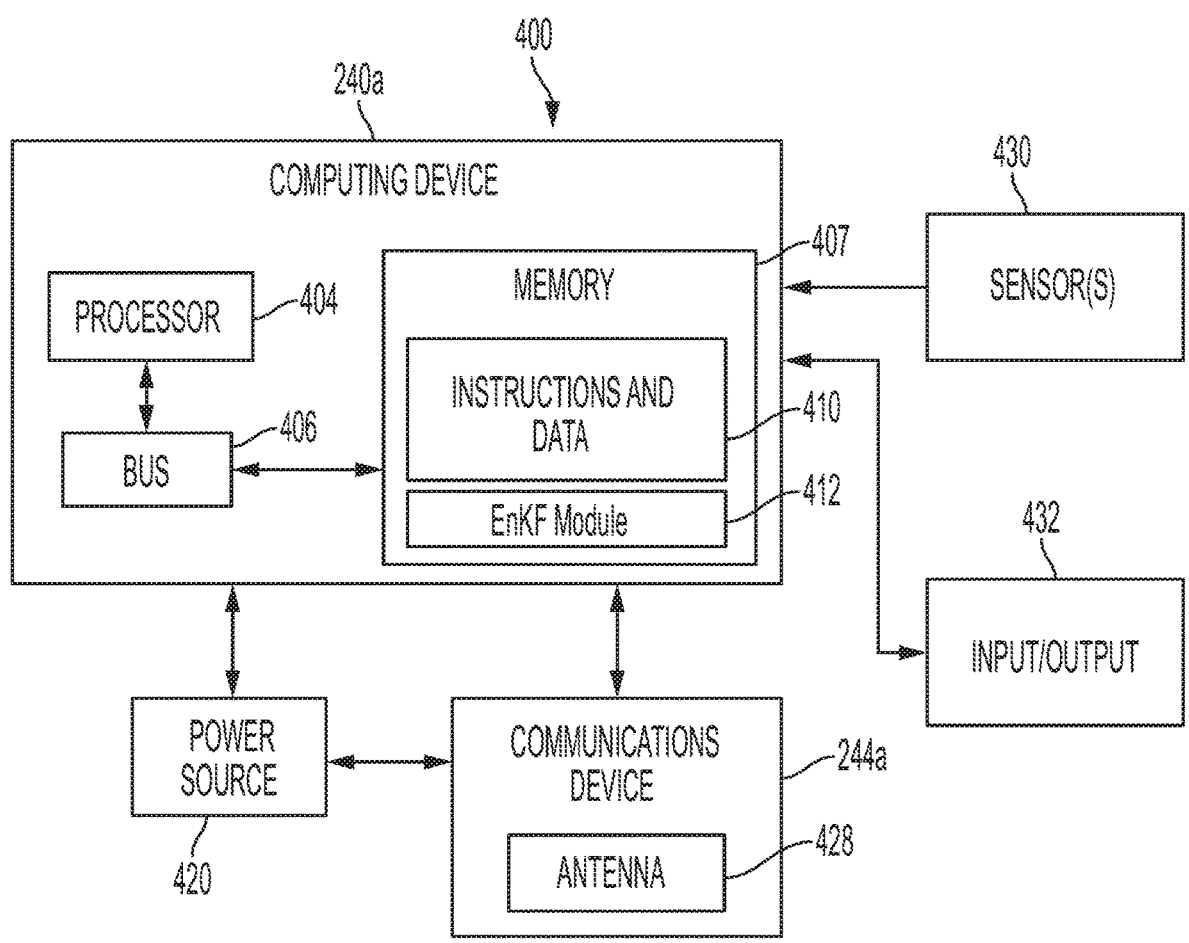
FIG. 4 is a block diagram of an example of a computing system for implementing various examples according to some aspects of the present disclosure.

FIG. 4 is a block diagram of an example of a computing system 400 for implementing various examples according to some aspects of the present disclosure. In some examples, the components shown in FIG. 4 (e.g., the computing device 240a, power source 420, and communications device 244a) can be integrated into a single structure. For example, the components can be contained within a single enclosure. In other examples, the components shown in FIG. 4 can be distributed (e.g., in separate enclosures) and in electrical communication with each other.

The system 400 includes a computing device, for example, computing device 240a. The computing device 240a can include a processor 404, a memory 407, and a bus 406. The processor 404 can execute one or more operations for executing a digital twin and/or executing operations of the standalone EnKF module including an EnKF algorithm. The processor 404 can execute instructions stored in the memory 407 to perform the operations. The processor 404 can include one processing device or multiple processing devices. Non-limiting examples of the processor 404 include a Field-Programmable Gate Array ("FPGA"), an application-specific integrated circuit ("ASIC"), a microprocessor, etc.

The processor 404 can be communicatively coupled to the memory 407 via the bus 406. The non-volatile memory 407 may include any type of memory device that retains stored information when powered off. Non-limiting examples of the memory 407 include electrically erasable and programmable read-only memory ("EEPROM"), flash memory, or any other type of non-volatile memory. In some examples, at least part of the memory 407 can include a medium from which the processor 404 can read instructions. A computer-readable medium can include electronic, optical, magnetic, or other storage devices capable of providing the processor 404 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 407 can store computer program instructions 410 for performing operations of collecting sensor data and executing a digital twin, for example, but not limited to, some or all of the operations described with respect to FIGS. 1 and 3. These instructions 410 can also be usable for initiating execution of the operations of the standalone EnKF module 412, including an EnKF algorithm that generates corrections to input parameters for the digital twin. Computer program instructions 410 can also display generated correction values and/or or forward those values to other systems using communication device 244a, and handle control of any required signaling.

The EnKF module 412 may be a standalone EnKF module operating as a microservice, e.g., a smaller application to execute the operations of the standalone EnKF module and communicate with the digital twin. The standalone EnKF module 412 may compare predictions generated by the digital twin with the streamed measurement data received from sensors monitoring a physical process and generate corrections to the input parameters for the digital twin. The standalone EnKF module 412 may take as input the prediction from the digital twin and measurement data of the same parameters/quantities as the prediction (e.g., production rate, fluid composition, etc.) and compare the digital twin predictions with their corresponding measurements to generate corrections. The standalone EnKF module 412 may operate in real-time or near real-time, receiving new input and generating new correction, for example every one-tenth of a second or another time period.

The system 400 can include a power source 420. The power source 420 can be in electrical communication with the computing device 240a and the communications device 244a. In some examples, the power source 420 can include a battery or an electrical cable (e.g., a wireline). In some examples, the power source 420 can include an AC signal generator. The computing device 240a can operate the power source 420 to apply a transmission signal to the antenna 428 to forward sensor data and/or digital twin input parameter corrections to other systems. For example, the computing device 240a can cause the power source 420 to apply a voltage with a frequency within a specific frequency range to the antenna 428. This can cause the antenna 428 to generate a wireless transmission. In other examples, the computing device 240a rather than the power source 420, can apply the transmission signal to the antenna 428 for generating the wireless transmission.

In some examples, part of the communications device 244a can be implemented in software. For example, the communications device 244a can include additional instructions stored in memory 407 for controlling the functions of communication device 244a. The communications device 244a can receive signals from remote devices and transmit data to remote devices (e.g., the remote computing device 240b of FIG. 2). For example, the communications device 244a can transmit wireless communications that are modulated by data via the antenna 428. In some examples, the communications device 244a can receive signals (e.g., associated with data to be transmitted) from the processor 404 and amplify, filter, modulate, frequency shift, and otherwise manipulate the signals. In some examples, the communications device 244a can transmit the manipulated signals to the antenna 428. The antenna 428 can receive the manipulated signals and responsively generate wireless communications that carry the data.

The computing system 400 can receive input from sensor(s) 430 operable to sense various process characteristics. Computer system 400 in this example also includes input/output interface 432. Input/output interface 432 can connect to a keyboard, pointing device, display, and other computer input/output devices. An operator may provide input using the input/output interface 432. Sensor data or other data related to the operation of the system can also be displayed to an operator through a display that is connected to or is part of input/output interface 432.

Figure 5:
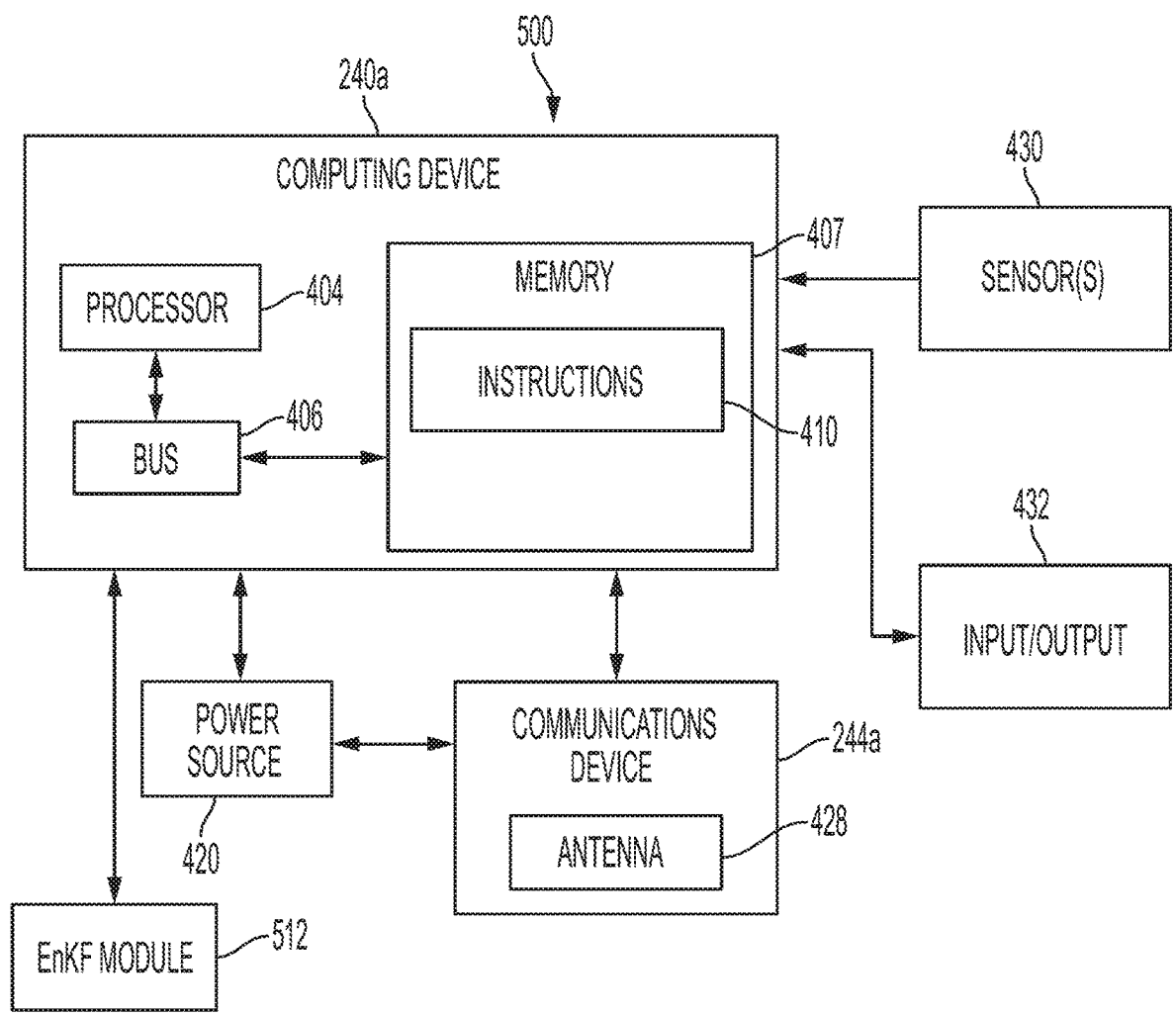
FIG. 5 is a block diagram of another example of a computing system for implementing various examples according to some aspects of the present disclosure.

FIG. 5 is a block diagram of another example of a computing system 500 for implementing various examples according to some aspects of the present disclosure. The example computing system FIG. 5 may include similar elements that perform similar functions as the elements in FIG. 4; therefore, their descriptions will not be repeated here. Referring to FIG. 5, the memory 407 can store computer program instructions 410 for performing operations of collecting sensor data and executing a digital twin, for example, but not limited to some or all of the operations described with respect to FIGS. 1 and 3. The standalone EnKF module 512 may be a physically separate hardware module in a self-contained enclosure electrically connected to the computing device 240a.

The standalone EnKF module 512 may be configured for wired or wireless communication with the computer system executing the digital twin. The standalone EnKF module 512 may compare predictions generated by the digital twin with the streamed measurement data received from sensors monitoring a physical process and generate corrections to the input parameters for the digital twin. The standalone EnKF module 512 may take as input the prediction from the digital twin and measurement data of the same parameters/quantities as the prediction (e.g., production rate, fluid composition, etc.) and compare the digital twin predictions with their corresponding measurements to generate corrections for the parameters. The standalone EnKF module 512 may operate in real-time or near real-time, receiving new input and generating new correction, for example every one-tenth of a second or another time period.

Figure 6:
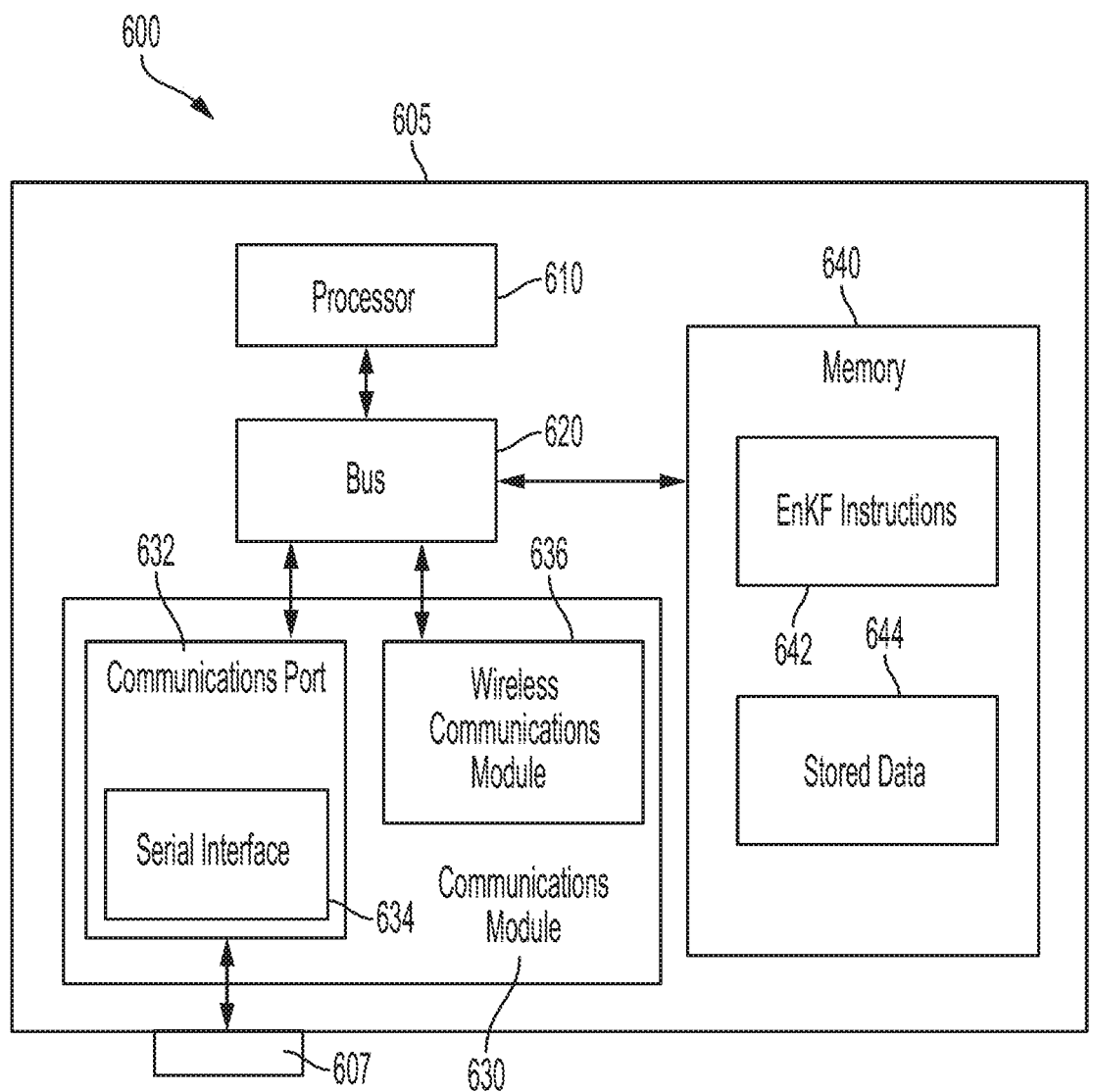
FIG. 6 is a block diagram of an example of an EnKF module implemented in a separate enclosure according to some aspects of the present disclosure.

FIG. 6 is a block diagram of an example of an EnKF module 600 implemented in a separate enclosure according to some aspects of the present disclosure. The EnKF module 600 can include a processor 610, a bus 620, a communications module 630, and a memory 640. In some examples, the components shown in FIG. 6 (e.g., the processor 610, the bus 620, the communications module 630, and the memory 640) can be integrated into a single structure. For example, the components can be within a single enclosure 605. The enclosure may include electrical connectors 607. The electrical connectors 607 may provide electrical connections between the EnKF module 600 and external devices, for example, but not limited to, sensors, a computing system executing a digital twin, other computing systems, etc. In other examples, the components shown in FIG. 6 can be distributed (e.g., in separate enclosures) and may be in electrical communication with each other.

The processor 610 can execute one or more operations for implementing a standalone EnKF module according to some examples of the present disclosure for use with a digital twin. The processor 610 can execute instructions stored in the memory 640 to perform the operations. The memory 640 may store other data, for example, but not limited to data obtained from sensors. The processor 610 can include one processing device or multiple processing devices. Non-limiting examples of the processor 610 include a Field-Programmable Gate Array ("FPGA"), an application-specific integrated circuit ("ASIC"), a microprocessor, etc.

The processor 610 can be communicatively coupled to the memory 640 via the bus 620. The non-volatile memory 640 may include any type of memory device that retains stored information when powered off. Non-limiting examples of the memory 640 include electrically erasable and programmable read-only memory ("EEPROM"), flash memory, or any other type of non-volatile memory.

In some examples, at least some of the memory 640 can include a medium from which the processor 610 can read instructions. A computer-readable medium can include electronic, optical, magnetic, or other storage devices capable of providing the processor 610 with computer-readable instructions or other program codes. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The communications module 630 may include a communications port 632 and a wireless communications module 636. The communications port 632 can be used to communicate with the external systems or devices, such as an external computer system and/or sensors gathering data from an oil and gas drilling/processing environment, for example via the electrical connectors 607 and may include interfaces such as Ethernet, USB, IEEE 1394, or a fiber optic interface. In some implementations, the communications module 630 may include a serial interface 634. The serial interface 634 may receive sensor data and digital twin model predictions from a computing device, for example the computing device 240a.

In some implementations, the digital twin may run in the cloud and digital twin model predictions and may be received by the computing device 240a and transmitted to the EnKF module 600 via the serial interface 634. Similarly, corrections for the input parameters of the digital twin generated by the processor 610 of the EnKF module 600 may be communicated to the computing device 240a via the serial interface 634 and transmitted to the cloud by the computing device 240a. Sensor data and digital twin prediction data received by the communications module 630 can be transmitted to the memory 640 via the bus 620.

The wireless communications module 636 may include wireless interfaces such as IEEE 802.11, Bluetooth, or radio interfaces for accessing cellular telephone networks (e.g., transceiver/antenna for accessing a CDMA, GSM, UMTS, or another mobile communications network). The wireless communications module 636 may be configured to communicate with a network, for example, the network 246. For example, in some implementations, the digital twin may run in the cloud and the EnKF module 600 may receive data output from the digital twin and transmit corrections for the input parameters of the digital twin via the wireless communications module 636.

The processor 610 may generate corrections for the input parameters of the digital twin and transmit the corrections to the computing device 240a via the communications module 630. For example, processor 610 of the standalone EnKF module 600 may take as input the prediction from the digital twin and streamed measurement data of the same parameters/quantities as the prediction (e.g., production rate, fluid composition, etc.) received via the communications module 630 and compare the digital twin predictions with their corresponding measurements to generate corrections. The standalone EnKF module 600 may operate in real-time or near real-time, receiving new input and generating new correction, for example every one-tenth of a second or another time period.

The memory 640 can store any sensor data as stored data 644 for implementing some examples. The memory 640 can include program code 642 for implementing an EnKF that can be executed for causing the computing device to perform operations for implementing a digital twin according to various examples of the present disclosure.

In accordance with various aspects of the present disclosure, the digital twin may be executed on a computing system including a workstation or laptop, or on a special purpose computing system designed to receive data from the drilling arrangement, or may be executed on a computing system in the cloud. Other variations for executing the digital twin can be recognized. The operations of the standalone EnKF Module may be executed as a micro-service on the same computing system that executes the digital twin or on a separate computing system (e.g., workstation, laptop, or special purpose computing system). When the digital twin is executed on a computing system in the cloud, operations of the standalone EnKF Module may be executed on a workstation, laptop, or special purpose computing system and the generated corrections sent to the cloud. In some implementations, the standalone EnKF Module may be configured in a physically separate enclosure from the computing system executing the digital twin and configured to communicate with the sensors and with the digital twin.

Figure 7:
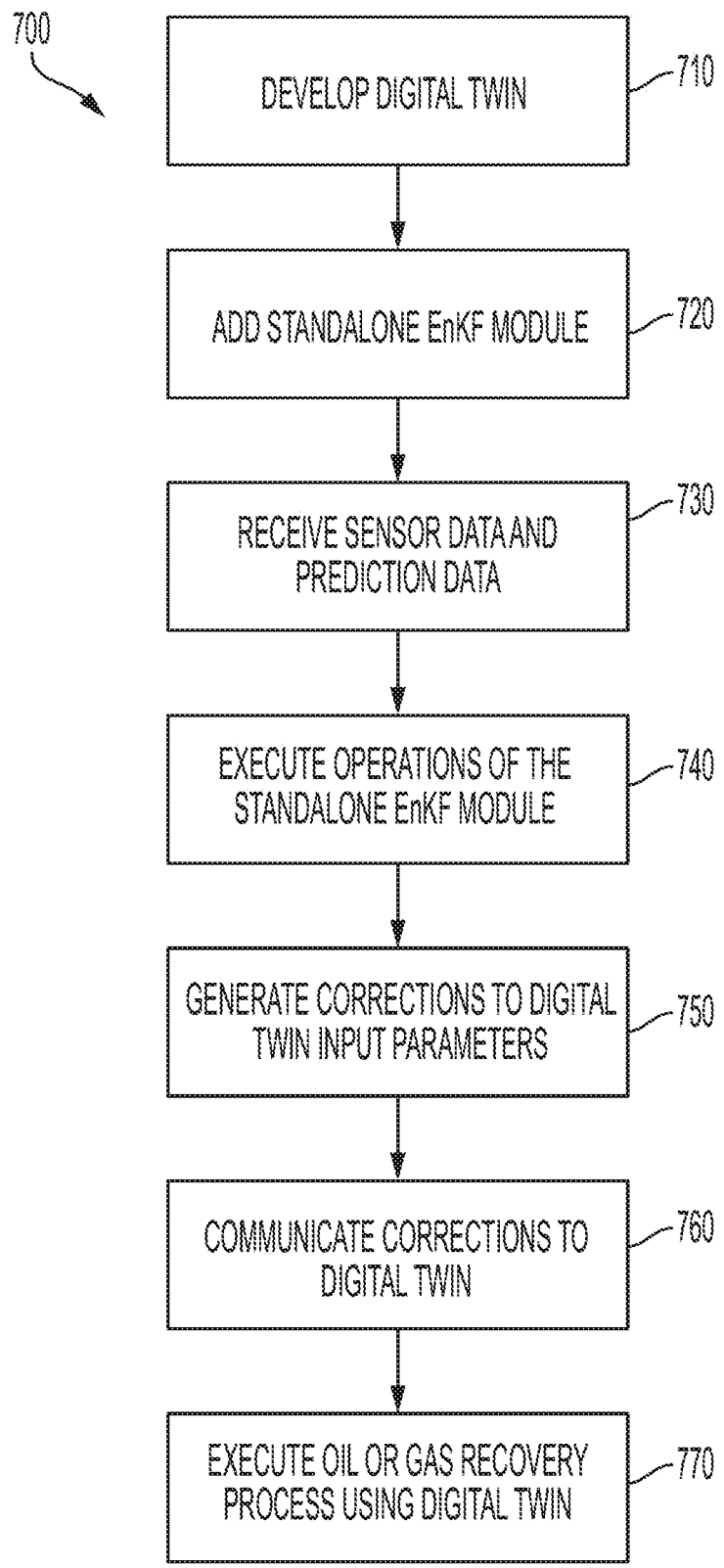
FIG. 7 is a flowchart of a method for implementing a self-adapting digital twin according to some aspects of the present disclosure.

FIG. 7 is a flowchart of a method 700 for implementing a self-adapting digital twin according to some aspects of the present disclosure. Referring to FIG. 7, at block 710, a digital twin may be developed for a fixed environment. For example, the digital twin may be a constant parameter digital twin and may be developed to model and oil or gas recovery process. At block 720, a standalone EnKF module may be added to operate with the digital twin. For example, the operations of the standalone EnKF module may be a microservice executing concurrently on the same computing system that executes the digital twin, a separate computing system in communication with the computing system executing the digital twin, or the standalone EnKF module may be housed in a separate enclosure and in wired or wireless communication with the computing system executing the digital twin.

At block 730, the standalone EnKF module may receive streaming measurement data and prediction data. For example, the streaming measurement data may be received from multiple sensors that measure physical parameters of the oil or gas recovery process. The prediction data may be predicted process parameters output from execution of the digital twin. At block 740, operations of the standalone EnKF module may be executed using the streaming measurement data and the prediction data from the digital twin. For example, operations of the standalone EnKF module may correlate the streaming measurement data received from each of the multiple sensors measuring a different process parameter with the prediction data received from the digital twin for the same process parameter.

At block 750, corrections to the process parameters input to the digital twin may be determined. The streaming measurement data and the prediction data for each process parameter may be compared. The result of executing the operations of the standalone EnKF module may be corrections to the process parameters. At block 760, the corrections to the process parameters may be communicated to the digital twin. For example, the corrections to the process parameter may be communicated to the computing system executing the digital twin. In some implementations, the operations of the standalone EnKF module may be executing as a micro-service on the same computing system as the digital twin is executing. In some implementations, the operations of the standalone EnKF module may be executing on a separate computing system in communication with the computing system executing the digital twin. In other implementations, the operations of the standalone EnKF module may be executing in a separate housing in communication with the computing system executing the digital twin.

At block 770, the digital twin may be used to execute an oil or gas recovery process. For example, the corrections to the process parameters may be used as input parameters for the digital twin to adapt subsequent executions of the digital twin to the physical process parameter measurements. The process parameter predictions generated by the digital twin may be used to execute the oil or gas recovery process.

The methods FIG. 7, may be embodied on a non-transitory computer readable medium, for example, but not limited to, the memory 407 or other non-transitory computer readable medium known to those of skill in the art, having stored therein a program including computer executable instructions for making a processor, computer, or other programmable device execute the operations of the methods.

It should be appreciated that the specific steps illustrated in FIG. 7 provide a particular method for implementing a self-adapting digital twin according to an example of the present disclosure. Other sequences of steps may also be performed according to alternative examples. For example, alternative examples of the present disclosure may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. Many variations, modifications, and alternatives can be recognized.

While the above examples of the standalone EnKF module have been described with respect to a digital twin for an oil or gas process, the standalone EnKF module may be used with a variety of software models without departing from the scope of the present disclosure.

In some aspects, a system and method for determining drilling fluid characteristics is provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a self-adapting digital twin of an oil and gas wellbore environment, the self-adapting digital twin including a digital twin developed using constant parameters for a fixed environment, the digital twin being operable to model an oil or gas recovery process; and a standalone Ensemble Kalman Filter (EnKF) module, the standalone EnKF module being configured to perform operations including: receiving streaming measurement data from multiple sensors measuring multiple parameters of the oil or gas recovery process; receiving prediction data from the digital twin; generating input parameter corrections for the digital twin by executing an EnKF algorithm using the streaming measurement data and the prediction data; communicating the input parameter corrections to the digital twin for causing adaptation of output predictions of the digital twin to the sensor data; and generating a modification to an operational parameter of the oil or gas recovery process based on the adapted output predictions.

Example 2 is the self-adapting digital twin of example(s) 1, wherein the modification includes a modification to a parameter of a drilling operation of the oil or gas recovery process.

Example 3 is the self-adapting digital twin of example(s) 1 or 2, wherein the modification includes an adjustment to a drilling direction in a wellbore for the oil or gas recovery process.

Example 4 is the self-adapting digital twin of example(s) 1-3, wherein the modification includes a modification to a parameter of a drilling fluid for a drilling operation of the oil or gas recovery process.

Example 5 is the self-adapting digital twin of example(s) 1-4, wherein the EnKF algorithm is executable by the standalone EnKF module on a same computing system on which the digital twin is executable or on a separate computing system being configured to communicate with the computing system on which the digital twin is executable.

Example 6 is the self-adapting digital twin of example(s) 1-5, wherein the standalone EnKF module is operable to: correlate the streaming measurement data received from each of the multiple sensors operable to measure different process parameters of the oil or gas recovery process with the prediction data received from the digital twin for corresponding process parameters, compare the correlated prediction data and measurement data for a same process parameter, and generate the input parameter corrections based on a result of comparing the correlated prediction data and measurement data.

Example 7 is a computer-implemented method, including creating a self-adapting digital twin of an oil or gas wellbore environment, wherein creating the self-adapting digital twin includes: incorporating a standalone Ensemble Kalman Filter (EnKF) module with a constant parameter digital twin developed for a fixed environment, receiving, by the standalone EnKF module, streaming measurement data from multiple sensors and prediction data from the digital twin, generating input parameter corrections for the digital twin by executing an EnKF algorithm with the standalone EnKF module using the streaming measurement data and the prediction data from the digital twin, and communicating the input parameter corrections to the constant parameter digital twin to generate subsequent prediction data modified based on the input parameter corrections; and using the subsequent prediction data to apply a modification to an operational parameter of an oil or gas recovery process.

Example 8 is the computer-implemented method of example(s) 7, wherein the modification includes a modification to a parameter of a drilling operation of the oil or gas recovery process.

Example 9 is the computer-implemented method of example(s) 7 or 8, wherein the modification includes an adjustment to a drilling direction in a wellbore for the oil or gas recovery process.

Example 10 is the computer-implemented method of example(s) 7-9, wherein the modification includes a modification to a parameter of a drilling fluid for a drilling operation of the oil or gas recovery process.

Example 11 is the computer-implemented method of example(s) 7-10, wherein the standalone EnKF module correlates the streaming measurement data received from each of the multiple sensors measuring different process parameters of the oil or gas recovery process with the prediction data received from the digital twin for corresponding process parameter, compares the correlated prediction data and measurement data for a same process parameter, and generates the input parameter corrections based on a result of comparing the correlated prediction data and measurement data.

Example 12 is the computer-implemented method of example(s) 7-11, wherein operations of the standalone EnKF module execute concurrently on a same computing system executing the digital twin or on a separate computing system in communication with a computing system executing the digital twin.

Example 13 is the computer-implemented method of example(s) 7-12, wherein program code for executing the operations of the standalone EnKF module is embodied on a non-transitory computer-readable medium.

Example 14 is a standalone Ensemble Kalman Filter (EnKF) module including a non-transitory computer-readable memory being configured to store instructions for executing an EnKF algorithm; a communications module being configured to communicate with multiple sensors and a digital twin of an oil or gas wellbore environment, the multiple sensors being configured to measure multiple process parameters of an oil or gas recovery process, and the digital twin being configured to model the oil or gas recovery process and to output prediction data of the multiple process parameters, the digital twin being executable on a separate computing system; and a processor being configured to communicate with the memory and the communications module, the processor being further configured to execute instructions for performing operations including: receiving streaming measurement data from the multiple sensors; receiving the prediction data from the digital twin; generating input parameter corrections for the digital twin by executing the EnKF algorithm using the streaming measurement data and the prediction data; communicating the input parameter corrections to the digital twin to generate subsequent prediction data modified based on the input parameter corrections; and generating a modification to an operational parameter of the oil or gas recovery process based on the subsequent prediction data.

Example 15 is the standalone EnKF module of example(s) 14, wherein the modification includes a modification to a parameter of a drilling operation of the oil or gas recovery process.

Example 16 is the standalone EnKF module of example(s) 14 or 15, wherein the modification includes an adjustment to a drilling direction in a wellbore for the oil or gas recovery process.

Example 17 is the standalone EnKF module of example(s) 14-16, wherein the modification includes a modification to a parameter of a drilling fluid for a drilling operation of the oil or gas recovery process.

Example 18 is the standalone EnKF module of example(s) 14-17, further including an enclosure being configured to enclose the memory, the communications module, and the processor, the communications module including a wired communications module, the enclosure including electrical connectors being configured to connect the wired communications module of the standalone EnKF module to the multiple sensors and the digital twin, the digital twin being executable on a separate computing system than the digital twin.

Example 19 is the standalone EnKF module of example(s) 14-18, further including an enclosure being configured to enclose the memory, the processor, and the communication module, the communications module including a wireless communication module being configured to wirelessly connect the standalone EnKF module to the multiple sensors and the digital twin, the digital twin being executable on a separate computing system than the digital twin.

Example 20 is the standalone EnKF module of example(s) 14-19, wherein the processor is operable to: correlate the streaming measurement data received from each of the multiple sensors operable to measure different process parameters of the oil or gas recovery process with the prediction data received from the digital twin for corresponding process parameters, compare the correlated prediction data and measurement data for a same process parameter, and generate the input parameter corrections based on a result of comparing the correlated prediction data and measurement data.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

The invention claimed is:

1. A computer-implemented method, comprising:
creating a self-adapting digital twin of an oil or gas wellbore environment, wherein creating the self-adapting digital twin includes:
incorporating a standalone Ensemble Kalman Filter (EnKF) module with a constant parameter digital twin developed using multiple sensors for a fixed environment having constant parameters that include boundary conditions,
receiving, by the standalone EnKF module, streaming measurement data from the multiple sensors and prediction data from the digital twin, the prediction data including a state vector that comprises parameters corresponding at least to permeability, fracture dimensions, properties of piping of the oil or gas wellbore environment, and viscosity of drilling fluid, wherein the state vector is generated at an initial time by randomly distributing each of the parameters of the state vector around corresponding estimated values for each of the parameters,
generating input parameter corrections for the digital twin by executing an EnKF algorithm with the standalone EnKF module using the streaming measurement data and the prediction data from the digital twin, the input parameter corrections corresponding to the parameters of the state vector, and
communicating the input parameter corrections to the constant parameter digital twin to generate subsequent prediction data modified based on the input parameter corrections; and
using the subsequent prediction data to apply a modification to operational parameters of an oil or gas recovery process, the operational parameters including (i) a drilling direction of the oil or gas recovery process and (ii) parameters of a production operation of the oil or gas recovery process; and
adjusting the drilling direction, for a drilling operation, in a wellbore for the oil or gas recovery process using the modification.

2. The computer-implemented method of claim 1, wherein the modification includes a modification to a parameter of a drilling operation of the oil or gas recovery process.

3. The computer-implemented method of claim 1, wherein the modification includes a modification to a parameter of a drilling fluid for a drilling operation of the oil or gas recovery process.

4. The computer-implemented method of claim 1, wherein the standalone EnKF module:
correlates the streaming measurement data received from each of the multiple sensors measuring different process parameters of the oil or gas recovery process with the prediction data received from the digital twin for corresponding process parameter,
compares the correlated prediction data and measurement data for a same process parameter, and
generates the input parameter corrections based on a result of comparing the correlated prediction data and measurement data.

5. The computer-implemented method of claim 1, wherein operations of the standalone EnKF module execute concurrently on a same computing system executing the digital twin or on a separate computing system in communication with a computing system executing the digital twin.

6. The computer-implemented method of claim 1, wherein program code for executing the operations of the standalone EnKF module is embodied on a non-transitory computer-readable medium.

7. A standalone Ensemble Kalman Filter (EnKF) module, comprising:
a non-transitory computer-readable memory being configured to store instructions for executing an EnKF algorithm;
a communications module being configured to communicate with multiple sensors and a digital twin of an oil or gas wellbore environment having constant parameters that include boundary conditions, the multiple sensors being configured to measure multiple process parameters of an oil or gas recovery process, and the digital twin being configured to model the oil or gas recovery process and to output prediction data of the multiple process parameters, the digital twin being executable on a separate computing system; and
a processor being configured to communicate with the memory and the communications module, the processor being further configured to execute instructions for performing operations including:
receiving streaming measurement data from the multiple sensors;
receiving the prediction data from the digital twin, the prediction data including a state vector that comprises parameters corresponding at least to permeability, fracture dimensions, properties of piping of the oil or gas wellbore environment, and viscosity of drilling fluid, wherein the state vector is generatable at an initial time by randomly distributing each of the parameters of the state vector around corresponding estimated values for each of the parameters;
generating input parameter corrections for the digital twin by executing the EnKF algorithm using the streaming measurement data and the prediction data, the input parameter corrections corresponding to the parameters of the state vector;
communicating the input parameter corrections to the digital twin to generate subsequent prediction data modified based on the input parameter corrections;
generating a modification to operational parameters of the oil or gas recovery process using the subsequent prediction data, the operational parameters including (i) a drilling direction of the oil or gas recovery process and (ii) parameters of a production operation of the oil or gas recovery process; and
adjusting the drilling direction, of a drilling operation, in a wellbore for the oil or gas recovery process using the modified operational parameters.

8. The standalone EnKF module of claim 7, wherein the modification includes a modification to a parameter of a drilling operation of the oil or gas recovery process.

9. The standalone EnKF module of claim 7, wherein the modification includes a modification to a parameter of a drilling fluid for a drilling operation of the oil or gas recovery process.

10. The standalone EnKF module of claim 7, further comprising:
an enclosure being configured to enclose the memory, the communications module, and the processor, the communications module including a wired communications module, the enclosure including electrical connectors being configured to connect the wired communications module of the standalone EnKF module to the multiple sensors and the digital twin, the digital twin being executable on a computing system that is separate from the standalone EnKF module.

11. The standalone EnKF module of claim 7, further comprising:
an enclosure being configured to enclose the memory, the processor, and the communication module, the communications module including a wireless communication module being configured to wirelessly connect the standalone EnKF module to the multiple sensors and the digital twin, the digital twin being executable on a computing system that is separate from the standalone EnKF module.

12. The standalone EnKF module of claim 7, wherein the processor is operable to:
correlate the streaming measurement data received from each of the multiple sensors operable to measure different process parameters of the oil or gas recovery process with the prediction data received from the digital twin for corresponding process parameters,
compare the correlated prediction data and measurement data for a same process parameter, and
generate the input parameter corrections based on a result of comparing the correlated prediction data and measurement data.

13. A non-transitory computer-readable medium comprising a self-adapting digital twin of an oil and gas wellbore environment, the self-adapting digital twin comprising:
a digital twin developed using multiple sensors for a fixed environment and constant parameters that include boundary conditions, the digital twin being operable to model an oil or gas recovery process; and
a standalone Ensemble Kalman Filter (EnKF) module, the standalone EnKF module being configured to perform operations including:
receiving streaming measurement data from the multiple sensors measuring multiple parameters of the oil or gas recovery process;
receiving prediction data from the digital twin, the prediction data including a state vector that comprises parameters corresponding at least to permeability, fracture dimensions, properties of piping of the oil and gas wellbore environment, and viscosity of drilling fluid, wherein the state vector is generatable at an initial time by randomly distributing each of the parameters of the state vector around corresponding estimated values for each of the parameters;
generating input parameter corrections for the digital twin by executing an EnKF algorithm using the streaming measurement data and the prediction data, the input parameter corrections corresponding to the parameters of the state vector;
communicating the input parameter corrections to the digital twin for causing adaptation of output predictions of the digital twin to the sensor data;
generating a modification to operational parameters of the oil or gas recovery process using the adapted output predictions, the operational parameters including (i) a drilling direction of the oil or gas recovery process and (ii) parameters of a production operation of the oil or gas recovery process; and
adjusting the drilling direction, for a drilling operation, in a wellbore for the oil or gas recovery process using the modified operational parameters.

14. The non-transitory computer-readable medium of claim 13, wherein the modification includes a modification to a parameter of a drilling operation of the oil or gas recovery process.

15. The non-transitory computer-readable medium of claim 13, wherein the modification includes a modification to a parameter of a drilling fluid for a drilling operation of the oil or gas recovery process.

16. The non-transitory computer-readable medium of claim 13, wherein the EnKF algorithm is executable by the standalone EnKF module on a separate computing system being configured to communicate with the computing system on which the digital twin is executable.

17. The non-transitory computer-readable medium of claim 13, wherein the standalone EnKF module is operable to:
correlate the streaming measurement data received from each of the multiple sensors operable to measure different process parameters of the oil or gas recovery process with the prediction data received from the digital twin for corresponding process parameters,
compare the correlated prediction data and measurement data for a same process parameter, and
generate the input parameter corrections based on a result of comparing the correlated prediction data and measurement data.

* * * * *